Sept. 19, 1967 W. P. ASHLEY, SR 3,342,535
HOLDER AND CARRIER
Filed March 30, 1964 3 Sheets-Sheet 1
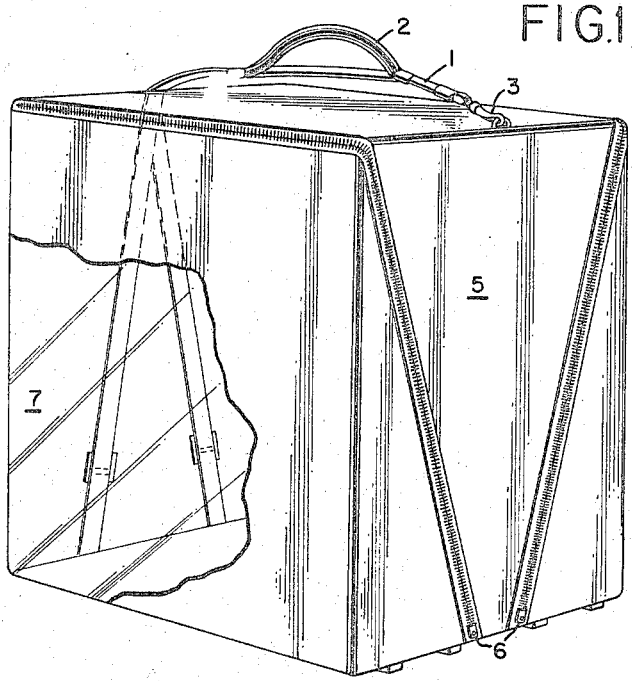
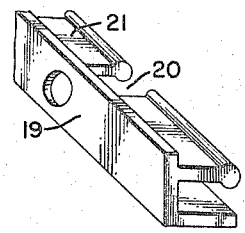
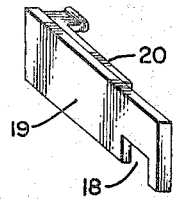
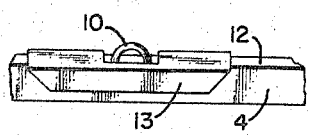
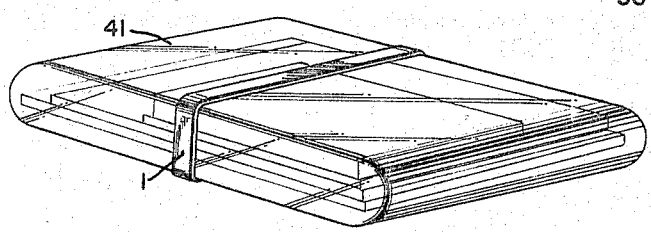
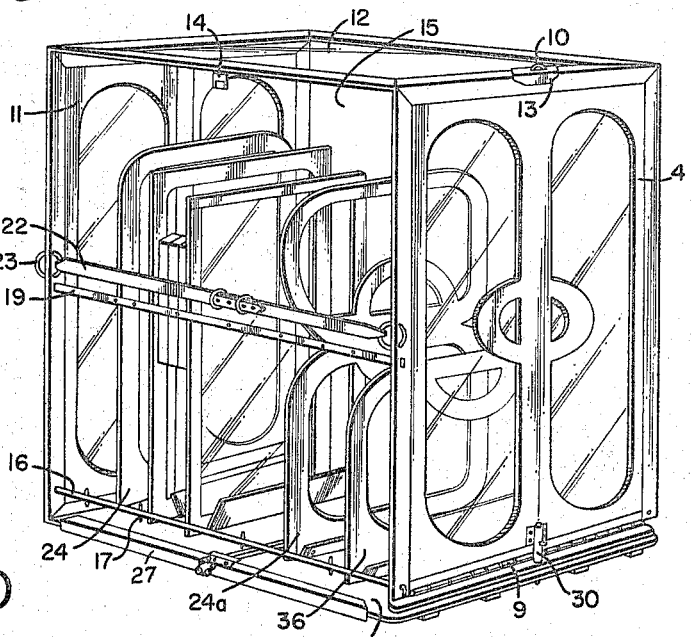
INVENTOR
WILSON PERKINS ASHLEY, SR.

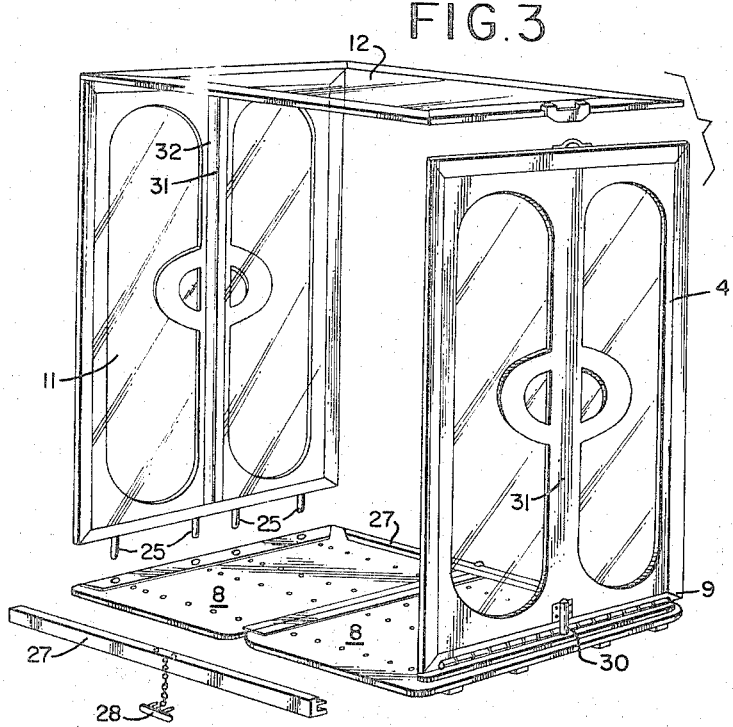
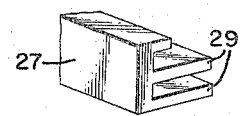
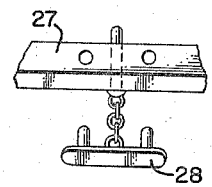
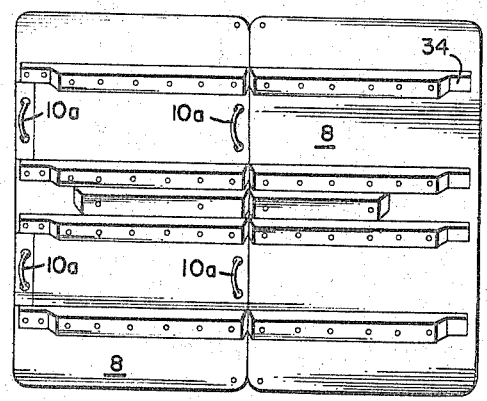
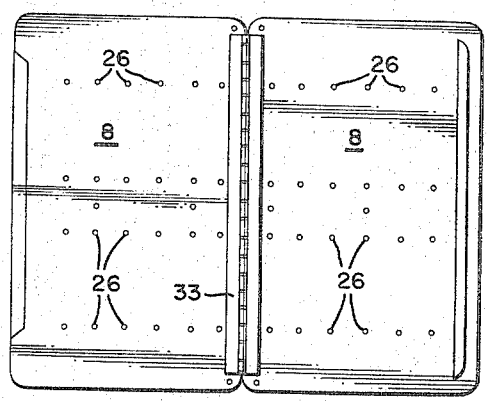

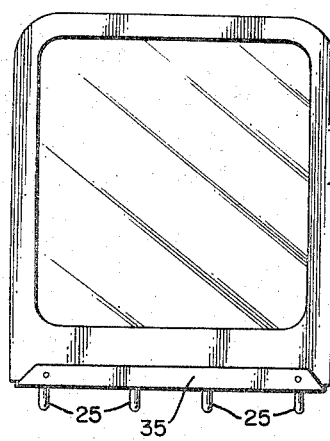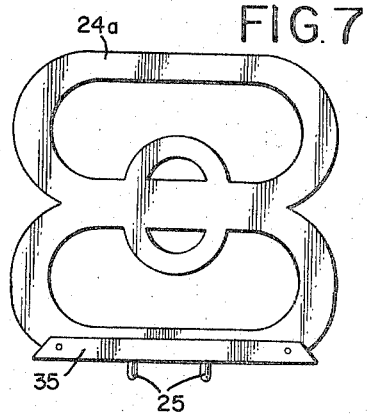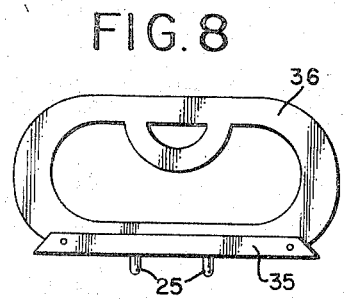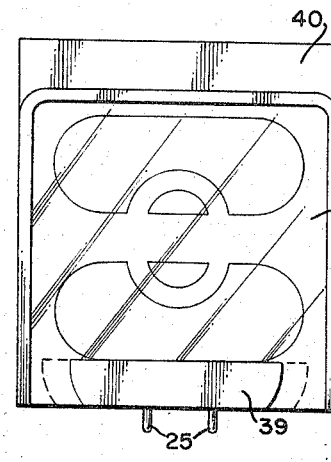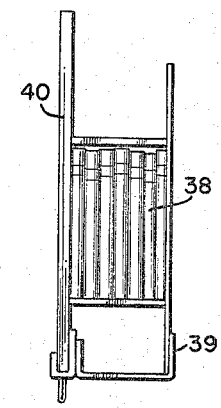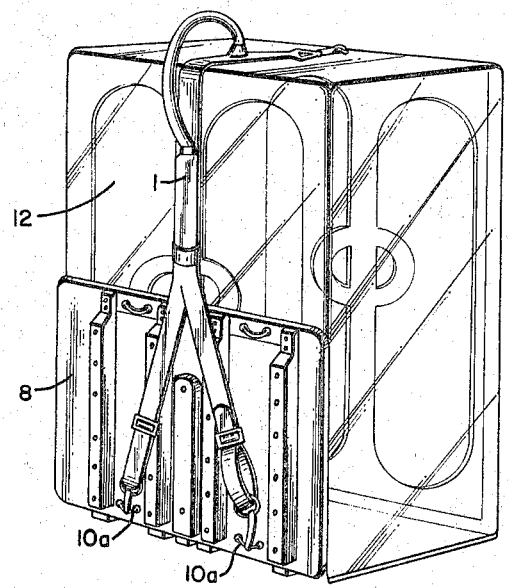

United States Patent Office 3,342,535
Patented Sept. 19, 1967

3,342,535
HOLDER AND CARRIER
Wilson Perkins Ashley, Sr., 3648–52 E. Stratford Road,
Rte. 1, Bayside Borough, Virginia Beach, Va. 23455
Filed Mar. 30, 1964, Ser. No. 355,967
8 Claims. (Cl. 312—6)

This invention relates to a holder and carrier device, and more particularly to a novel and multi-purpose device for storing, filing, transporting, or displaying materials in a unique manner.

It is therefore an object of this invention to provide a novel, inexpensive, and convenient structure to replace many different structures (trunks, valises, bags, boxes, and portfolios) for storage or display purposes.

Another object is to provide a carrying structure which has unlimited possibilities for display purposes and as a means to alleviate many filing problems for the traveling salesman.

Still another object of the invention is to provide a compact display structure which is easily converted into a multi-purpose display rack.

Yet another object is to provide a completely self-contained filing cabinet or conveyor structure.

A further object is to provide a structure which has the possibility of a multiplicity of sizes and uses.

With these and various other objects in view, the invention consists of certain novel features of construction and operation as will be more fully described and pointed out in the specification, drawings, and claims herein submitted.

In the drawings, the various views illustrate embodiments as herein set forth.

FIG. 1 illustrates the invention as prepared for transporting with an adjustable carrying strap and handle.

FIG. 2 illustrates the invention in a usable condition in one embodiment thereof.

FIG. 2a, 2b, and 2c illustrate details of certain features of FIG. 2.

FIG. 3 illustrates a disassembled portion of the structure with a collapsible front-piece.

FIGS. 3a and 3b illustrate details of the top of certain features of FIG. 3.

FIG. 4 is an illustration of a base-piece.

FIG. 5 is a bottom view of a base-piece.

FIG. 6 is one embodiment of a spacer.

FIG. 7 is a different embodiment of a spacer.

FIGS. 8, 9 and 9a are further embodiments of spacers.

FIG. 10 is a view of the device in a collapsed position.

FIG. 11 illustrates an embodiment of the invention in a transporting position.

In the assembly of the device, referring particularly to FIG. 1, an embodiment of the invention illustrates a suspender-type, webb, adjustable, carrying strap 1 having a built-in handle 2 and a front snap-hook 3 which is preferably of the swivel design. The snap-hook is attachable to a bracket or other attachment means on the front-piece 4 at the top thereof. The carrying strap may be attached to the base-piece of the structure as will be later described. An outer, protective, non-transparent plastic cover 5, having a dual zipper 6, covers the device when in transporting position. A cut-out portion illustrates a plastic, transparent, inner, protective cover 7 with dual zippers similar to dual zippers 6. These covers may be unzipped for removal thereof, or they may be lifted directly from the structure, if the carrying strap 1 has been unhooked from the front-piece 4.

In the more detailed embodiment of FIG. 2, a base-piece 8 supports a multiplicity of parts, some of which will be more fully described in other views. Front-piece 4 is a transparent, reinforced, rigid structure which is attached to the base-piece by means of a hinge 9, allowing the front-piece to be lowered to rest on the base-piece when the structure is in the collapsed position. An eye 10 is located on top of the front-piece 4 in order to receive the snap-hook of the carrying strap. Holes or attachment means are provided on the sides of the front-piece to permit support members or rods to pass therethrough or to be connected to said front-piece in the assembly of the device. Rear-piece 11 is similar to front-piece 4 in design, but is connected to the base-piece 8 by means of anchor pegs 25 (illustrated in FIG. 3). By hinge means, top-piece 12 is connected to rear-piece 11. This transparent, rigid, reinforced, top-piece 12 may swing 270 degrees, allowing the top-piece and reinforced rear-piece to rest in a back-to-back relationship when the top-piece is completely opened. A reinforced structure 13 having a slot is provided at the front of top-piece 12 in order to facilitate the passage of eye 10. This structure 13 is further illustrated in FIG. 2c. The side walls of top-piece 12 may contain recessed slots or lock receiving means in conjunction with the locking member 14 attached to the side-pieces.

FIG. 2 further illustrates rigid, transparent "Rohm and Haas" Plexiglas (acrylic plastic), side-pieces 15 which are hinged on rods 16 inserted through front-piece 4 and threaded into the rear-piece 11. The side-piece 15 is attached to the hinge rod 16 by extended brass chain link 17 or other appropriate attachment means. These side-pieces may be held in the closed position by either a magnetic type lock 14, a key operated lock, or other locking means, in conjunction with top-piece 12. The lock device may be fastened to the side-piece 15 by extended chain link, small nuts and bolts, or other securing means. A key locking means, working in conjunction with top-pieces 12, is preferable in this type of structure. These side-pieces provide accessibility to the inside of the structure from either side thereof.

Reinforcing guide and support members 19 are connected between the front-piece 4 and the rear-piece 11 by means of a slot structure 18 as is more fully shown in FIG. 2b. These support members 19 have slots 20 facing inward, as shown in detail in FIG. 2a, to hold other members of the structure in the proper spaced relation in conjunction with anchor peg holes in the base-piece 8. These members may be made of aluminum or other rigid material. The type of slot 20 may be altered, as illustrated in FIG. 2b, to facilitate the holding of various types of structures inside the completed assembly. The grooved upper portion 21 of the support member 19 may be used as a support for a second compartment or upper section of the assembly, thereby allowing a double-decked structure.

Leather support members 22, with buckle means at the ends thereof, are attached to the front-piece and rear-piece by ring members 23 for easy installation, and are useful for alleviating slipping and swaying of any top-heavy merchandise within the structure. When unbuckled, these straps may hang conveniently within the structure. Spacers 24, of many different designs, may be located within the device. These transparent, reinforced spacers 24 are held in place by anchor pegs 25 extending into anchor peg holes 26 in base-piece 8 and by reinforcing side support members 19.

Referring to FIG. 4, base-piece 8 contains a multiplicity of rows of anchor peg holes 26 for receiving the rear-piece 11 and spacers. A metal support bar 27, see FIG. 3, is herein shown removed from the base-piece in order to better show its operation. A lock member 28 is connected to the support bar 27 by a chain (FIG. 3b) or other securing means, and is insertable through the support bar and base-piece in order to hold the support bar in its proper position. The top portion of the support bar acts as a baffle or stopping device for the bottom portion of the side-piece 15 (FIG. 2), while the base-piece 8 fits within the opening between the two lower flanges (FIG. 3a) or sections 29 of the structure. The support bar 27, when in position, (FIG. 2) prevents the hinged base-piece from collapsing.

Front-piece 4 has, connected thereto, a thumb-operated, sliding, a bolt-type locking member or latch 30 which protrudes downward in order to lock front-piece 4 in an upright position with respect to base-piece 8. The sliding bolt or latch extends into the base-piece 8, preventing the front-piece 4 from turning about the hinge 9. The rear-piece 11 and top-piece 12, joined together by a hinge, may be removed from the base-piece 8 by lifting the anchor pegs 25 of the rear-piece from the base-piece. Reinforced rear-piece 11 and front-piece 4 contains an aluminum strip 31 with a center rib 32 protruding therefrom, whereby greater reinforcement is provided. This center strip 31 supports the sliding lock structure 30 of the front-piece 4 and has utility as a guide or "track" for a double deck support structure in a different embodiment. This track member has further utility as a support for internal shelving for display purposes within an assembly such as this.

In reference to FIG. 4, base-piece 8 is a two piece structure joined by a hinge 33, and containing five rows of anchor peg holes 26 for receiving the anchor pegs of rear-piece 11 and a multiplicity of spacers 24. With or without front-piece 4, or rear-piece 11, this structure has versatile utility as a book, magazine, or paper rack, as well as other uses. The base-piece can be constructed from Masonite board or other rigid materials, and in different embodiments may have rollers or casters thereon.

Referring to FIG. 5, a bottom view of the base-piece 8 contains supports or runners 34 which have cut portions at the ends thereof to facilitate stacking. Carrying strap brackets 10a may be attached at various locations on the bottom of the base-piece 8, although the most convenient locations are at the front or rear ends of the rear section of the base-piece.

Referring to FIG. 6, a transparent spacer 24, which has an aluminum base 35 and anchor pegs 25 for insertion into the base-piece 8, is shown. This spacer 24 can be cut from Masonite or other rigid material which will reinforce or support the transparent plastic covering. The design of spacer 24 may be varied and is not limited to those presented herein.

A different embodiment of the spacer 24a is set forth in FIG. 7, said spacer being a transparent, plastic, reinforced member having utility similar to that of the spacer 24 of FIG. 6.

Still another embodiment of a spacer is set forth in FIG. 8, said spacer 36 being approximately one-half as tall as the other spacers and having its preferred utility in a double-deck structure. This spacer is a reinforced, transparent, plastic structure which may, however, be used in conjunction with any of the other spacers.

Referring to FIGS. 9 and 9a a spacer 37 which contains a pen and pencil holder structure 38 and having a base member 39 wide enough to support papers, pads, books, or other materials, is shown. Anchor pegs 25 extend from this spacer as from the other spacers. The body piece 40 has a cut-out design similar to the design of FIG. 7, and a transparent flexible cover is a protective member for the contents of this special type structure.

A collapsed structure 41 is illustrated in FIG. 10, which structure is complete with the components and is packed for storage or shipment. The adjustable carrying strap 1 efficiently binds the collapsed structure and provides a handle thereon for transporting.

A different embodiment is set forth in FIG. 11 wherein all of the component parts are not used, thereby providing a smaller holder and carrier structure which can be converted into the larger structure. The base-piece 8 is folded at the hinge, as illustrated in FIG. 4, and the top-piece is folded upward and back over rear-piece 11, thereby resting adjacent said rear-piece. The base-piece 8, upon being folded upward, holds the top-piece 12 in position. The carrier strap 1 can be adjusted to fit this structure accordingly.

Having thus described the invention, what is claimed as new and desired to secure by Letters Patent, is:

1. A collapsible, multi-purpose structure having a reinforced, base-piece with a multiplicity of rows of anchor peg holes, a base support bar and locking device removably engaged on each side of said base-piece, a removable, transparent rear-piece attached to said base-piece by means of anchor pegs extending into anchor peg holes on the base-piece, a transparent, rigid front-piece connected to the base-piece by means of a hinge, a locking means connected to the front-piece and engageable with the base-piece to prevent the front-piece from collapsing upon the base-piece, except when the locking means is disengaged from the base-piece, a top-piece connected to the top of the rear-piece by a hinge, said top-piece being a rigid, reinforced, transparent member which, when opened, allows access to the structure, side-pieces hinged on a rod structure between the front-piece and rear-piece allowing access to the structure from either side thereof, and locking means near the tops of the side-pieces to hold the side-pieces in a closed position, said locking means acting in conjunction with the top-piece.

2. A collapsible, multi-purpose structure as set forth in claim 1, wherein an adjustable carrying strap is connected to the rear section of the base-piece and to the top of the front-piece for transporting the structure.

3. A collapsible, multi-purpose structure as set forth in claim 1, wherein an adjustable carrying strap is connected to the rear-piece and to the top of the front-piece for transporting the structure, and a combination of two transparent, plastic, protective cover members, with zippers, between the carrying strap and the structure.

4. A collapsible, portable, substantially transparent holder and carrier structure having: a multi-purpose, base-piece containing a multiplicity of rows of anchor peg holes, a base support bar and locking device on each side of said base-piece and engaged therewith, a fixed, reinforced, transparent front-piece connected to said base-piece by means of a hinge, a locking member connected to the front-piece and engageable with the base-piece to prevent collapsing of the front-piece, except when the locking member is disengaged, a removable, reinforced, transparent rear-piece attached to the base-piece by anchor pegs extended into the anchor peg holes of the base-piece, a top member connected to the rear-piece by a hinge, said top member being a rigid, reinforced, transparent member which, when raised, allows access to the structure, side-pieces hinged on a rod structure between the front-piece and rear-piece allowing access to the structure from either side thereof, locking means near the top of the side-pieces to engage the top-piece and keep the side-pieces in the closed position, a multiplicity of transparent spacers supported on the base-piece by anchor pegs extending into the anchor peg holes, and support members connected between the front-piece and rear-piece to hold and support the spacers in the proper spaced relationship at all times, said support members having slots to fit around the edges of the spacers for holding said spacers.

5. A collapsible, portable, substantially transparent holder and carrier structure as set forth in claim 4, wherein a leather support member is attached to the front-piece and rear-piece by ring members, said leather support member being a means to prevent movement of items contained within the holder and carrier structure.

6. A collapsible, portable, substantially transparent holder and carrier structure as set forth in claim 4, wherein an adjustable carrying strap is connected at the bottom of the base-piece and at the top of the front-piece, thereby providing a carrying means for the structure.

7. A collapsible, portable, substantially transparent holder and carrier structure as set forth in claim 4, wherein a leather support member is attached to the front-piece and rear-piece, said leather support member preventing movement of items contained within the structure, an adjustable carrying strap connected at the bottom of the base-piece and at the top of the front-piece to provide a carrying means for the structure, and a combination of removable, protective cover members secured by zippers about said structure between the carrying strap and the transparent holder and carrier structure.

8. A collapsible, portable, substantially transparent holder and carrier structure having: a multi-purpose, base-piece containing a multiplicity of rows of anchor peg holes, a base support bar and locking device on each side of said base-piece and engaged therewith, a fixed, reinforced, transparent front-piece connected to said base-piece by means of a hinge, a locking member connected to the front-piece and engageable with the base-piece to prevent collapsing of the front-piece, except when the locking member is disengaged, a removable, reinforced, transparent rear-piece attached to the base-piece by anchor pegs extended into the anchor peg holes of the base-piece, a top-piece connected to the rear-piece by a hinge, said top-piece being a rigid, reinforced, transparent member which, when raised, allows access to the structure, side-pieces hinged on a rod structure between the front-piece and rear-piece allowing access to the structure from either side thereof, locking means near the top of the side-pieces to engage the top-piece and keep the side-pieces in the closed position, a multiplicity of transparent spacers supported on the base-piece by anchor pegs extending into the anchor peg holes, support members connected between the front-piece and rear-piece to hold and support the spacers in the proper spaced relationship at all times, said support members having slots to fit around the edges of the spacers for holding said spacers, a leather support member attached to the front-piece and rear-piece, said leather support member preventing movement of items contained within the structure, an adjustable carrying strap connected at the bottom of the base-piece and at the top of the front-piece in order to provide a carrying means for the structure, a combination of removable, protective cover members secured by zippers about said structure between the carrying strap and the transparent holder and carrier structure, and a reinforced, wide-bottom spacer nearer the front-piece or rear-piece having a compartment for holding papers, pencils, or other materials, and having a protective covering thereon.

References Cited

UNITED STATES PATENTS

| | | | |
|---|---|---|---|
| 1,059,023 | 4/1913 | Berry | 312—6 |
| 1,458,562 | 6/1923 | Trompeter | 108—112 |
| 1,822,448 | 9/1931 | Morin | 312—258 |
| 1,986,077 | 1/1935 | Spang | 312—258 X |
| 2,416,783 | 3/1947 | Vallieres | 190—43 |

FOREIGN PATENTS

| | | |
|---|---|---|
| 193,099 | 1/1957 | Austria. |
| 1,000,721 | 2/1952 | France. |

CHANCELLOR E. HARRIS, *Primary Examiner.*